(12) United States Patent  (10) Patent No.: US 8,442,935 B2
Cottle et al.  (45) Date of Patent: May 14, 2013

(54) EXTRACT, TRANSFORM AND LOAD USING METADATA

(75) Inventors: Aaron D. Cottle, Redmond, WA (US); Jagan M. Peri, Hyderabad (IN); Srinivasa R. Burugapalli, Sammamish, WA (US); Veerendra K. Koya, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 49 days.

(21) Appl. No.: 13/076,291

(22) Filed: Mar. 30, 2011

(65) Prior Publication Data

US 2012/0254103 A1  Oct. 4, 2012

(51) Int. Cl.
*G06F 17/00*  (2006.01)

(52) U.S. Cl.
USPC ........... 707/602; 707/756; 707/761; 707/802; 707/809; 707/975

(58) Field of Classification Search .................. 707/602, 707/756, 761, 802, 809, 975
See application file for complete search history.

(56) References Cited

U.S. PATENT DOCUMENTS

| | | | |
|---|---|---|---|
| 7,321,939 B1 * | 1/2008 | Porter | 709/238 |
| 7,805,462 B2 * | 9/2010 | Dupont et al. | 707/802 |
| 7,836,063 B2 * | 11/2010 | Salazar et al. | 707/756 |
| 8,190,555 B2 * | 5/2012 | Venugopal et al. | 707/602 |
| 8,200,614 B2 * | 6/2012 | Syed et al. | 707/602 |
| 2004/0215584 A1 * | 10/2004 | Yao | 706/12 |
| 2005/0187974 A1 | 8/2005 | Gong | |
| 2007/0130180 A1 * | 6/2007 | Rasmussen | 707/100 |
| 2008/0222634 A1 | 9/2008 | Rustagi | |
| 2008/0270350 A1 | 10/2008 | Bojanic et al. | |
| 2009/0177671 A1 * | 7/2009 | Pellegrini et al. | 707/100 |
| 2010/0153351 A1 | 6/2010 | Yung et al. | |
| 2010/0218134 A1 * | 8/2010 | B'Far et al. | 715/780 |
| 2010/0287106 A1 | 11/2010 | Halkus et al. | |

OTHER PUBLICATIONS

Ahimanikya Satapathy, "Building an ETL Tool", SOA/Business Integration, Sun Microsystems, 2006.*
Sampath Kumar, "Documenting ETL Rules using CA Erwin Data Modeler", 2009.*
Abid Ahmad et al., "Using Distributed Database Technology to Simplify the ETL Component of Data Warehouse", 2010, (pp. 61-65).
"Extract, Transform, Load", Oct. 25, 2010, http://it.toolbox.com/wiki/index.php/Extract,_Transform,_Load, (8 pages).
Eric Johnson, "Building ETL Processes for Business Intelligence Solutions", Jul. 10, 2008, (6 pages).

* cited by examiner

*Primary Examiner* — Hung Le
(74) *Attorney, Agent, or Firm* — Workman Nydegger

(57) ABSTRACT

The extract and transformation operation performed on multiple data sources. In the extract operation, a computing system periodically performs an extraction operation on the data sources, perhaps as defined by metadata. The transformation operation is performed on at least some the extracted data, and is periodically performed, perhaps also in a manner that is defined by metadata. When performing each iteration of the transformation operation, the computing system performs a transformation operation on valid data, marks other data as suspect (due to a dependency on data that is not present), and completes transformation on yet other data that had previously been marked as suspect or perhaps reaffirms its suspect status if the needed data is still not available.

19 Claims, 3 Drawing Sheets

300

400

EXTRACT, TRANSFORM AND LOAD USING METADATA

BACKGROUND

For any given problem, relevant data is often available from a wide variety of data sources. Business Intelligence (BI) software applications take such disparate data, and make it available in a more helpful and uniform form in a data warehouse. Extract, Transform, and Load (ETL) techniques are used in the industry to move such heterogenic data into a data warehouse from which useful information may be more easily acquired by business logic of the business intelligence. The extract phase involves acquiring data from the data sources in their native form. The transform phase involves transforming such data into a form that is more understandable to the business logic. The load phase involves making such transformed data available to the business logic.

Typically, ETL processing techniques process once or a few times in a day on a small number of data sources. Furthermore, the ETL processing the sequencing of the ETL steps is often hard-coded. For example, to account for dependencies between data sources, perhaps the ETL process waits until all database backups for the day have arrived and been made available to the ETL process.

BRIEF SUMMARY

At least one embodiment described herein relates to an extract and transformation operation performed on multiple data sources. In the extract operation, a computing system periodically performs an extraction operation on the data sources. In an embodiment in which the extract operation is metadata-driven, the timing for performing extraction may differ depending on the editable data. Likewise, the identity of the data elements that are extracted may also be defined by the editable data.

The transformation operation is performed on at least some of the extracted data, and is periodically performed. In an embodiment in which the transformation operation is metadata-driven, the timing and definition of the transformation operation may also be defined by the editable data. When performing each iteration of the transformation operation, the computing system performs a transformation operation on valid data, marks other data as suspect (due to a dependency on data that is not present), and completes transformation on yet other data that had previously been marked as suspect or perhaps reaffirms its suspect status if the needed data is still not available.

Thus, rather than having to wait until all data is extracted to complete all dependencies, the transformation operation may be initiated even if not all data is present. This may be especially helpful in circumstances in which there are a variety of data sources, and/or the rules from extraction cause different extraction timings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, extract and transformation operations are performed on multiple data sources. In the extract operation, a computing system periodically performs an extraction operation on the data sources, perhaps as defined by metadata. The transformation operation is performed on at least some the extracted data, and is periodically performed, perhaps also in a manner that is defined by metadata. When performing each iteration of the transformation operation, the computing system performs a transformation operation on valid data, marks other data as suspect (due to a dependency on data that is not present), and completes transformation on yet other data that had previously been marked as suspect or perhaps reaffirms its suspect status if the needed data is still not available. A load operation may subsequently be performed to complete the Extract, Transform, Load (ETL) sequence thereby making results ready for business logic. First, some introductory discussion regarding computing systems will be described with respect to FIG. 1. Then, the embodiments of the extract, transform, load operations will be described with respect to FIGS. 2 through 4.

Figure 1:
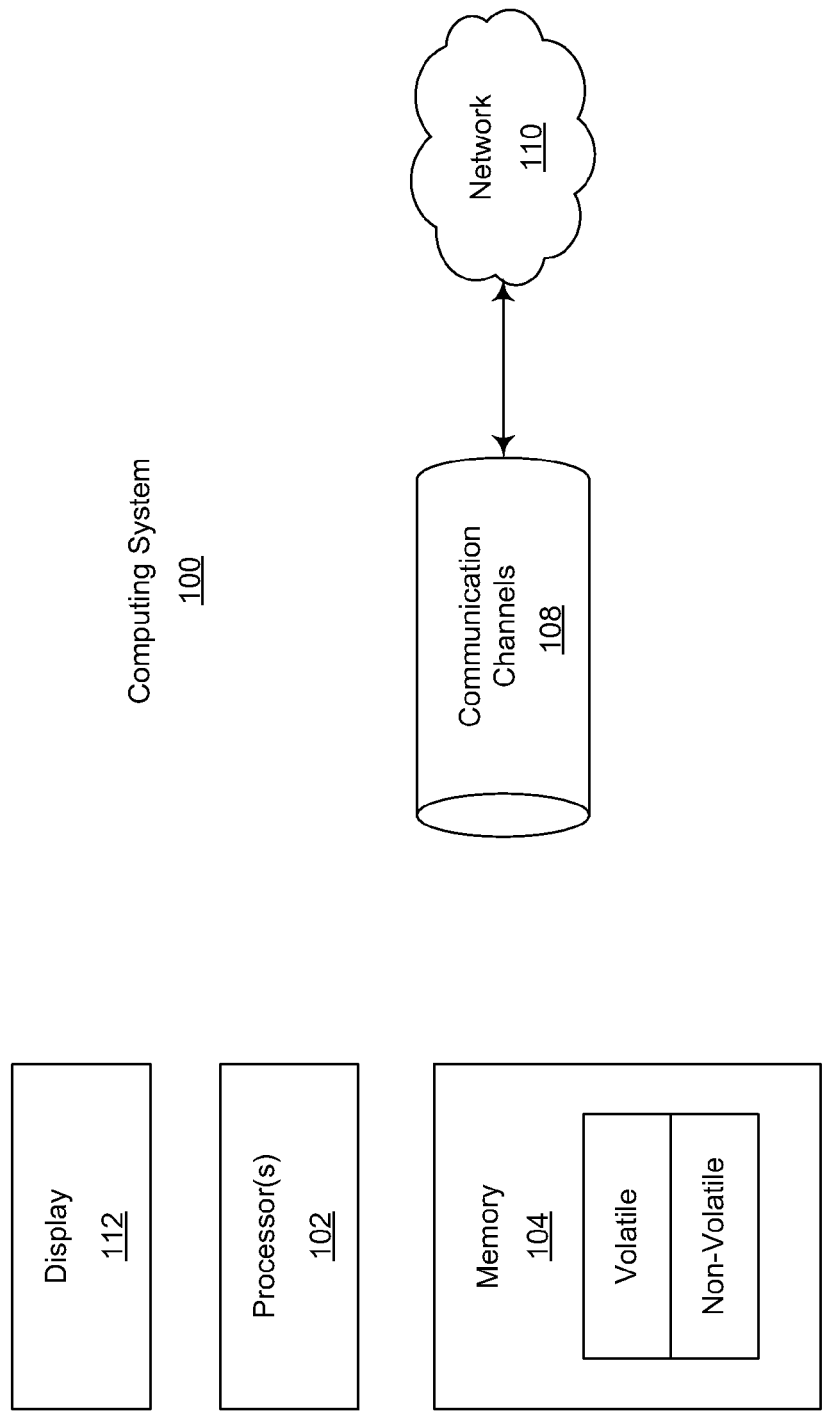
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems. As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system may also include a display 112 that may display one or more user interfaces that a user of the computing system may interface with.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
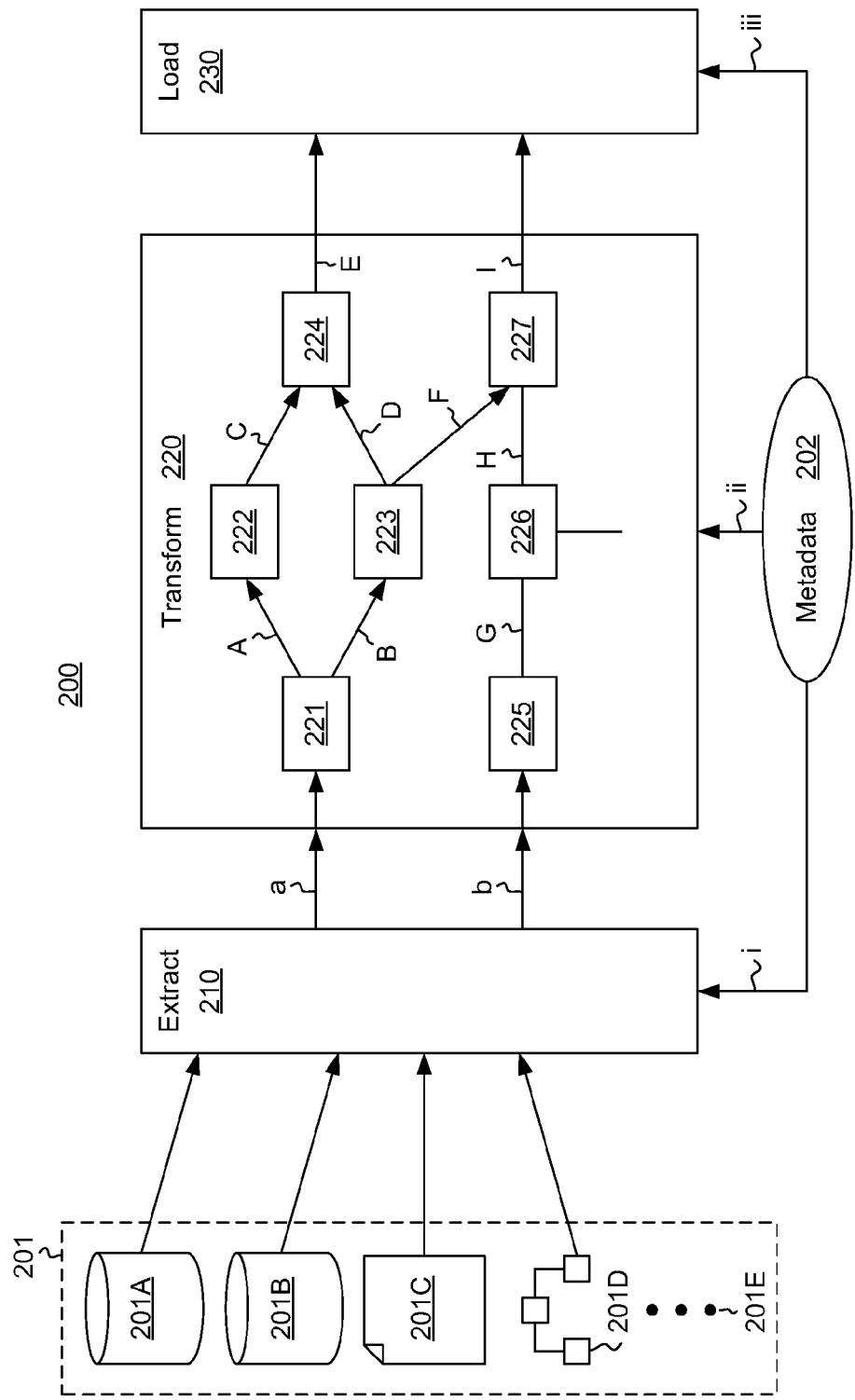
FIG. 2 illustrates an environment in which a three phase extract, transform, load operation may be performing in accordance with the principles described herein.

FIG. 2 illustrates an environment 200 in which a three phase extract, transform, load operation may be performed in accordance with the principles described herein. The environment includes an extract component 210 that performs an extract operation on data from multiple data sources 201, a transform component 220 that performs a transform operation on the extracted data, and a load component 230 that performs a load operation on the transformed data.

Metadata 202 is provided to one, some, or even all of the three operations to control the operations. The metadata 202 may be maintained in any suitable metadata repository such as, for example, a relational database, and may be organized in any manner. For instance, if the metadata 202 is organized in a relational database, the database tables may be related in a manner that the metadata 202 can be effectively accessed by the various components 210, 220, and 230. The metadata 202 may be editable so as to account for changes in the environment such as, changes in the data sources 201, or the data that is to be extracted from the data source, changes in the transform operation, and changes to the load operation.

In the illustrated embodiment, the data sources 201 are illustrated as including data sources 201A, 201B, 201C and 201D. However, the ellipses 201E represent significant flexibility in the number of different data sources that may be accessed by the extract component. There could be as few as one data source, but perhaps also hundreds, thousands, or so on with no practical limit. Also, data sources 201A and 201B are illustrated as being the same type of data source, representing that all of the data sources 201 may be of the same type. Data sources 201C is illustrated as being a different type of data source as compared to data sources 201A and 201B, representing that the data sources 210 may include different types of data sources. Data source 201D is illustrated as being yet another different type of data source. Accordingly, ellipses 201E also symbolically represent that the data source may be of different types, although that need not be the case. As examples only, different types of data sources might include databases (such as relational databases), hierarchically structured data sources (such as XML files), and flat files.

The extract component 210 performs the extract operation in which the data is acquired from the data sources in its native form (in accordance with the schema and format that is native to the data source). Metadata 202 may control various aspects of the extract operation as represented by arrow i. For instance, there may be different extract operations for each type of data source (e.g., database, XML file, flat file). The metadata 202 may also control or define the extraction frequencies, which may be variable or constant from one period of extract to the next, and which may differ depending on the data source type or other surrounding circumstances. The metadata 202 may include knowledge of the schema of each of the data sources. The metadata 202 might define which elements of each data source are to be extracted. For each element to be extracted, the metadata 202 may further define how often to extract and how to apply delta rules in cases in which the extracted data represents incremental changes as compared to previously extracted data. The metadata 202 may also define constraints to apply to the extracted data. For instance, perhaps some data in certain ranges are to be ignored or have some preliminary processing (e.g., truncation or rounding) applied.

The transform component 220 performs the transform operation. The transform operation may be quite complex for any given extracted data, or may be quite simple. The principles described herein are not limited to the precise transformation operation, nor its constituent transformation actions.

As an example only, the transform operation 220 receives first extracted data "a" from the extract component 210, performs transform action 221 on the extracted data a to generate data A (which is provided to transform action 222) and to generate data B (which is provided to transform action 223). Thus, in addition to perhaps other actions, the transform action 221 performs a branching operation in the overall transformation operation 220. The transform action 222 receives and processes data A to generate data C, which is provided to transform action 224. The transform action 223 receives and processes data B to generate two items of data: data D which is provided to transform action 224, and data F, which is provided to transform action 227. Note that transform action 227 is actually in the transform path for processing extracted data b. Thus, the ability to accurately transform extracted data b depends on the presence of extracted data a. In the final act of transforming extracted data a, the transform action 224 performs a merge operation by receiving data C and data D and generating transformed data E, which is provided to the load component 230.

As another example, the extracted data b is processed through a sequence of transform actions: first transform action 225 to generate data G, then transform action 226 to generate data H, and then transform action 227 to generate data I, which is then provided to the load component 230. Note that transform action 227 relies on both the presence of data F as well as the data H. Thus, although the overall transform operation 220 may be accurately performed on extracted data "a" without the presence of data b, the transform operation 220 may not be performed on data b without the presence of data a. In conventional transform operations, this would result in delay in the performance of the transform operation. However, using the principles described herein, certain parts of data I (that rely on data a) may be marked as suspect, and perhaps even certain parts of the data I (that do not rely on data a) may be generated so long as some partial results may be helpful.

The metadata 202 may also provide information that drives the transformation component 220 as represented by arrow ii. For instance, the metadata 202 could describe for each extracted data element: 1) what transform actions to apply to the extracted data elements, 2) define those transform actions, 3) define the sequence or hierarchy of the transform actions, and/or 4) apply constraints to the transform operation (e.g., perhaps some transform actions are adjusted in response to current conditions).

The load component 230 makes the transformed data available into a data warehouse, where it is made available for subsequent business logic. The metadata 202 may also provided information to the load component 230 to thereby potentially control the load operation. For instance, the metadata 202 may control the load frequency, the load rules, or load conditions.

Figure 3:
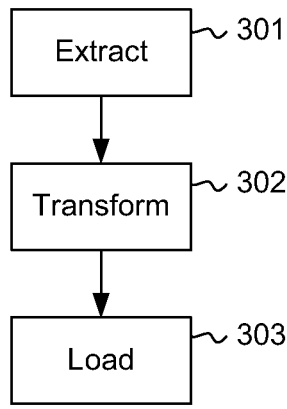
FIG. 3 illustrates a flowchart of a method for performing an extract, transform, and load from multiple data sources.

FIG. 3 illustrates a flowchart of a method 300 for performing an extract, transform, and load from multiple data sources. The method 300 may be performed by, for example, the computing system 100 of FIG. 1 by providing a computer program product having one or more computer storage media to the computing system 100, and then having the one or more processors 102 of the computing system execute computer-executable instructions that are on the one or more computer storage media.

The computing system repeatedly performs an extraction operation (act 301) on the data sources. For instance, this act may be performed by the extraction component 210 of FIG. 2 as directed by the metadata 202. Once again, the extraction operation may differ depending on the data source type, depending on the data source itself, and/or depending on the data element being extracted. Accordingly, for systems in which there are larger numbers of data sources, it is entirely possible that some data elements will be available for the transform operation, but others will not.

The computing system also periodically performs a transformation operation (act 302) on the extracted data. For instance, this act may be performed by the transform component 220 of FIG. 2 as directed by the metadata 202. In accordance with the principles described herein, data that relies on other unavailable data for processing may be marked as suspect without delaying transforms on other available data that do not rely on unavailable data. More regarding how suspect data is treated will be described with respect to FIG. 4.

Remaining for the moment on FIG. 3, the computing system periodically performs a load operation (act 303) on the transformed data. This act may be performed by the load component 230 of FIG. 2 as directed by the metadata 202 as represented by arrow iii.

Figure 4:
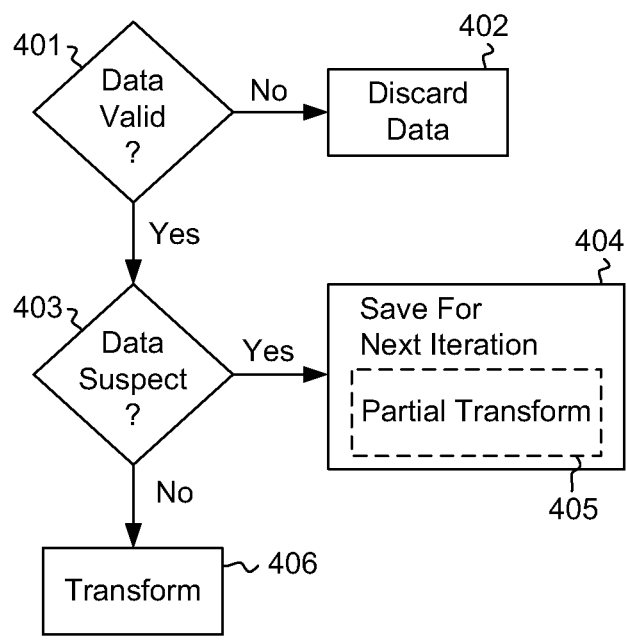
FIG. 4 illustrates a flowchart of a method for performing a transformation operation in the context of the presence of some suspect data.

FIG. 4 illustrates a flowchart of a method 400 for performing a transformation operation in the context of the presence of some suspect data. For each iteration of the transformation operation, there are at least four potential types of data.

First, invalid data is available data, but data which has not passed a validation test designed to test for minimum acceptable reliability of the data.

Second, valid data is available data that has passed applicable validation test(s) and which has all dependent input data also available.

Third, some data (referred to herein as "suspect" data), passes the applicable validation test(s), but for some reason one or more items of input data necessary or advantageous to fully transform the data is not yet available. This is entirely possible since there may be many data sources, and data elements to be extracted from each data source, and since extraction frequencies may differ depending on the data source and/or extracted element, and also since the lifetime of previously extracted data elements may be finite.

Fourth, some data (referred to herein as "previously suspect" data) remains from a prior iteration of the transformation operation. This data may still be suspect (if its input data is still not available), but the data will be again evaluated to determine if it is still suspect.

The method 400 may be performed for each data element to be evaluated (each newly available data element for this iteration of the transformation operation, or each previously suspect data that remains from prior iterations of the transformation operation).

The data is evaluated for validity (decision block 401). If the data is not valid (No in decision block 401), then the data is discarded (act 402). Keeping the data around and rechecking in subsequent iterations of the transformation operation will not be beneficial since the data will always be invalid and thus rechecking would be wasteful on computing resources. In some cases, it is possible that previously suspect data may have previously passed validity tests, but for some reason now is invalid. For instance, the validity test itself may have relied on the presence of input data that caused the data to be marked as suspect in the first place. Thus, it could not be determined that the suspect data was invalid until the data was made available.

If the data is determined to be valid (Yes in decision block 401), then it is determined whether the data is suspect (decision block 403). If the data is suspect due to the absence of other data yet to be extracted (Yes in decision block 403), the data is marked as suspect and preserved for consideration in a subsequent iteration of the transformation operation. The suspect data may be partially transformed (act 405) at this state to the extent that some transform actions in the hierarchy may be performed without the not-yet-extracted input data. This would be useful if, for example, the partially transformed data would be helpful to have available prior to the next iteration of the transform operation.

If the data is not suspect (No in decision block 403), then the transform operation proceeds (act 406). For instance, in FIG. 2, the transform component 220 performs the transform operation and makes the transformed data available to the load component 230.

The principles described herein allow for the extract/transform/load operations to be performed on a variety of data sources. The removal of data sources or addition of new data sources is made more convenient since the process is metadata-driven. For instance, to add a new data source of a particular type, the metadata that is specific to data sources of that particular type may be applied to the new data source without further modification or without significant modification.

Furthermore, there is considerable flexibility on which the extract operation, transform operation, and load operations may be performed. For instance, the transform operation need not wait until all data has been extracted. Transformations may be performed on the extracted data that does not rely on the data that is yet to be extracted. Furthermore, even that data that does rely on yet-to-be-extracted data may have partial transformations performed thereon. Thus, the environment 200 is flexibility and more easily scales to large numbers of different data sources.

Finally, in the case where the metadata 202 is a relational database, that relational database can be navigated to do impact analysis that show all items of transformed data that use a particular data source, or a particular data element within a data source.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more physical computer storage device having thereon computer-executable instructions that are structured such that, when executed by one or more processors of a computing system, cause the computing system to perform a method for performing an extract and transform of data from a plurality of data sources, the method comprising:
   an act of the computing system repeatedly performing an extraction operation on a plurality of data sources;
   an act of the computing system periodically performing a transformation operation on the extracted data, wherein the act of periodically performing a transformation operation for each of at least one iteration of the transformation operation comprises:
      for at least some of the extracted data that are valid, an act of performing a transformation operation on the valid data;
      for at least some of the extracted data that are dependent on other data that is not yet extracted, and an act of identifying the extracted data element as suspect; and
      for at least some extracted data that had been marked as suspect in a prior interaction of the transformation operation, an act of completing transformation of the previously-marked suspect data.

2. The computer program product in accordance with claim 1, wherein the iteration of the transformation operation includes the following for the at least some of the extracted data that are dependent on other data that is not yet extracted:
   an act of partially performing a transformation operation on the extracted data.

3. The computer program product in accordance with claim 2, wherein the iteration of the transformation operation includes the following for the least some of the extracted data that had been marked as suspect in a prior interaction of the transformation operation:
   an act of completing transformation on the previously-marked suspect data that had been partially transformed in the prior transformation.

4. The computer program product in accordance with claim 1, wherein the period for extraction may differ depending on the identity of the data source.

5. The computer program product in accordance with claim 4, wherein the period of extraction is variable from one period to the next and is defined by editable data.

6. The computer program product in accordance with claim 4, wherein the period of extraction is variable one data source to the next and is defined by editable data.

7. The computer program product in accordance with claim 1, wherein the transformation operation is defined by editable data and may differ by data source.

8. The computer program product in accordance with claim 1, wherein the transformation operation is defined by editable data and may differ by component within a data source.

9. The computer program product in accordance with claim 1, wherein the computer-executable instructions are further structured such that the method further comprises:
an act of performing a load operation on the transformed data.

10. The computer program product in accordance with claim 1, wherein the transformation operation includes a sequence of transformations.

11. The computer program product in accordance with claim 1, wherein the transformation operation includes at least one branch operation.

12. The computer program product in accordance with claim 1, wherein the transformation operation includes at least one merge operation.

13. The computer program product in accordance with claim 1, wherein the load operation is defined by editable data and may differ by component within a data source.

14. A method for a computing system to perform an extract and transform of data from a plurality of data sources, the computing system comprising one or more physical processors, the method comprising:
an act of the computing system repeatedly performing an extraction operation on a plurality of data sources, wherein the period for extraction may differ depending on the identity of the data source, wherein the period and manner of extraction are defined by metadata;
an act of the computing system periodically performing a transformation operation on the extracted data, wherein the transformation operation is also defined by metadata, and wherein the act of periodically performing a transformation operation for each of at least one iteration of the transformation operation comprises:
for at least some of the extracted data that are valid, an act of performing a transformation operation on the valid data;
for at least some of the extracted data that are dependent on other data that is not yet extracted, and an act of identifying the extracted data element as suspect; and
for at least some extracted data that had been marked as suspect in a prior interaction of the transformation operation, an act of completing transformation of the previously-marked suspect data.

15. The method in accordance with claim 14, wherein the iteration of the transformation operation includes the following for the at least some of the extracted data that are dependent on other data that is not yet extracted:
an act of partially performing a transformation operation on the extracted data.

16. The method in accordance with claim 15, wherein the iteration of the transformation operation includes the following for the least some of the extracted data that had been marked as suspect in a prior interaction of the transformation operation:
an act of completing transformation on the previously-marked suspect data that had been partially transformed in the prior transformation.

17. The method in accordance with claim 14, further comprising:
an act of performing a load operation on the transformed data.

18. The method in accordance with claim 14, wherein the transformation operation includes a plurality of transformations.

19. A computer program product comprising one or more physical computer storage device having thereon computer-executable instructions that are structured such that, when executed by one or more processors of a computing system, cause the computing system to perform a method for performing an extract and transform of data from a plurality of data sources, the method comprising:
an act of periodically performing an extraction operation on a plurality of data sources, wherein the period for extraction may differ depending on the identity of the data source and is performed in a manner that is defined by editable data;
an act of periodically performing a transformation operation on the extracted data, wherein the act of periodically performing the transformation operation is performed in a manner that is defined by the editable data, wherein the act of periodically performing a transformation operation for one iteration of the transformation operation comprises:
for at least some of the extracted data that are valid, an act of performing a transformation operation on the valid data;
for at least some of the extracted data that are dependent on other data that is not yet extracted, an act of partially performing a transformation operation on the extracted data, and an act of identifying the extracted data element as suspect and thus subject to further transformation in a subsequent iteration of the transformation operation; and
for at least some extracted data that had been subject to partial transformation in a prior interaction of the transformation operation, an act of completing transformation of that partially transformed data.

* * * * *